March 23, 1965     E. F. BAEHR     3,174,279
ROCKET THRUST CHAMBER

Filed Feb. 13, 1962     2 Sheets-Sheet 1

INVENTOR
EDWARD F. BAEHR

BY

ATTORNEY

March 23, 1965  E. F. BAEHR  3,174,279
ROCKET THRUST CHAMBER
Filed Feb. 13, 1962  2 Sheets-Sheet 2

INVENTOR
EDWARD F. BAEHR

BY *J. W. O'Brien*
ATTORNEY

United States Patent Office 3,174,279
Patented Mar. 23, 1965

3,174,279
ROCKET THRUST CHAMBER
Edward F. Baehr, Berea, Ohio, assignor to the United States of America as represented by the Administrator of the National Aeronautics and Space Administration
Filed Feb. 13, 1962, Ser. No. 173,081
12 Claims. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

This invention relates to rocket motor thrust chambers and, more particularly, to the provision of large area-ratio nozzles therefor.

Most large area-ratio nozzles have been provided for rocket motor thrust chambers heretofore by splicing additional tubes to provide for the increased circumference. This is necessary because otherwise as the area ratio of the nozzle increases, the tubes must be continually flattened in order to provide for the increasing circumference. Some of the difficulties involved therewith are in regard to structurally-deficient nozzles and also flow passages therein having a very small passage height. Another difficulty with the tube-splicing application is that the surfaces thereof are not smooth, either in the cooling passages, or the interior surface of the nozzles. Additionally, the spliced joint is often difficult to seal and often requires excessive fill-in material for the lack of a close fit.

It is desirable to provide large area-ratio nozzles for a lightweight rocket motor thrust chamber construction such as that disclosed in applicant's Patent No. 2,943,442 wherein there is described a very lightweight thrust chamber construction utilizing extremely light gauge channels. However, because of the thin walls of the channels, it is very difficult and time-consuming to utilize the hereinbefore mentioned tube splicing concept with channels of this nature, particularly when the wall is reduced to a thickness of 0.004 inch.

Accordingly, one object of this invention is to provide a type of a rocket motor thrust chamber construction wherein large area-ratio nozzles may be easily obtained.

Another object of the present invention is to provide for increasing the number of channels used in building rocket thrust chambers by the channel construction technique to provide large area-ratio nozzles.

Still another object of the invention is to provide a new and novel technique for increasing the number of channel flow passages simply and in a clean fashion.

According to the present invention, the foregoing and other objects are obtained by the provision in a rocket thrust chamber of an annular wall which is formed from a plurality of axially disposed pairs of juxtaposed elongated channels extending from adjacent one extremity at which point the channels comprising each pair are respectively disposed in radially superimposed relation to each other. At a zone intermediate the extremities of the chamber, the respective passages of each pair are rotated 90° about the axis of the corresponding pair of channels to dispose the channels in side-by-side relation as they extend toward the opposite extremity. With more particular reference to a rocket thrust chamber composed of three identifiable sections; namely, a combustion chamber, a throat, and a nozzle portion, the nozzle portion is formed of a compound wall having radially spaced inner and outer surfaces formed from a plurality of elongated compound channel members disposed in contiguous side-by-side relationship to define an internal annular chamber. The outwardly extending ribs of the respective compound channel members are covered with a metallic binding which is circumferentially wound about the exterior of the nozzle, throat, and combustion chamber portions to form the enclosed elongated channels aforesaid. The compound channel members are characterized by a main web member, the marginal edges of which are provided with upstanding flange portions, and a supplementary web portion disposed in predetermined geometric relation to the main web and flanges. In a transition section, the geometric disposition of the supplementary web varies progressively from spaced parallel relation to the main web at one end of the transition section to an angular relation at the opposite end of the transition section and preferably a 90° angular perpendicular relation. As indicated above, web means forming a closing web portion across the flange extremities is provided, such as by wrapping the entire chamber with a band in a circumferential manner and with adjacent band edges in overlapping and interlocking relation subsequently brazed to isolate the channels from each other and the ambient atmosphere. There are thus formed a pair of channels within each compound channel member.

A more complete appreciation of the invention and many of the attendant advantages thereof will be readily appreciated as the same becomes better understood by reference to the following detailed description when considered in connection with the accompanying drawings wherein.

Figure 1:
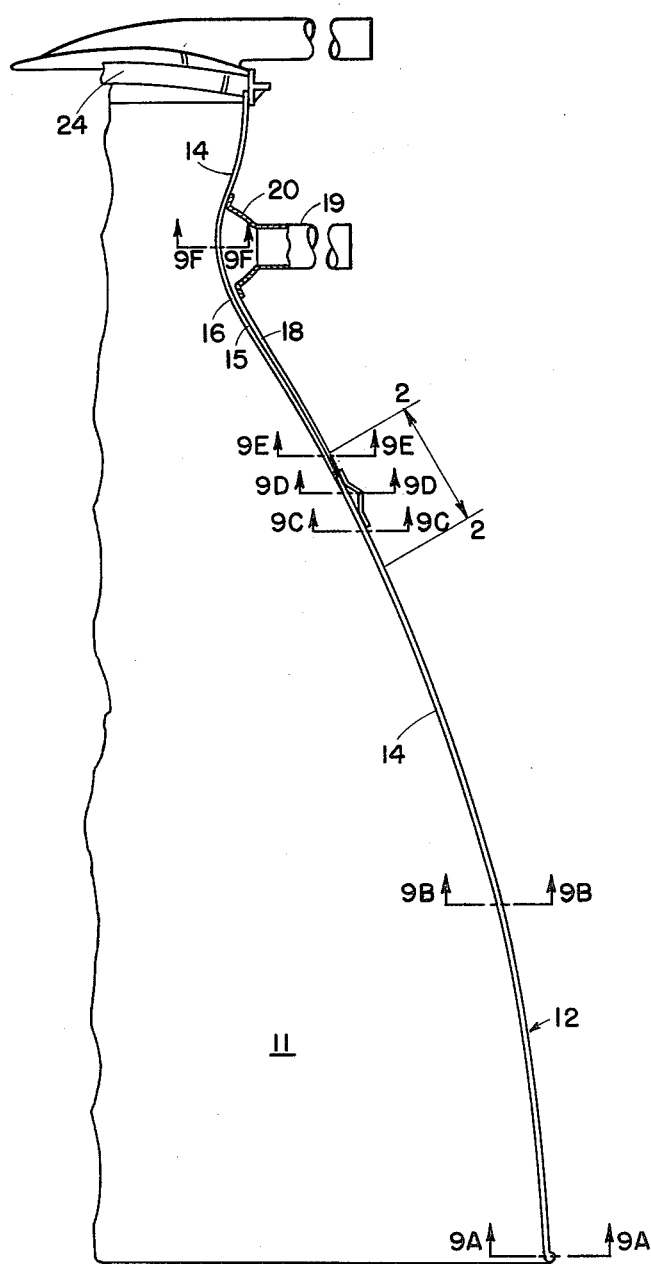
FIG. 1 is a fragmentary cross-sectional view of a rocket thrust chamber in accordance with the present invention.
Figure 9:
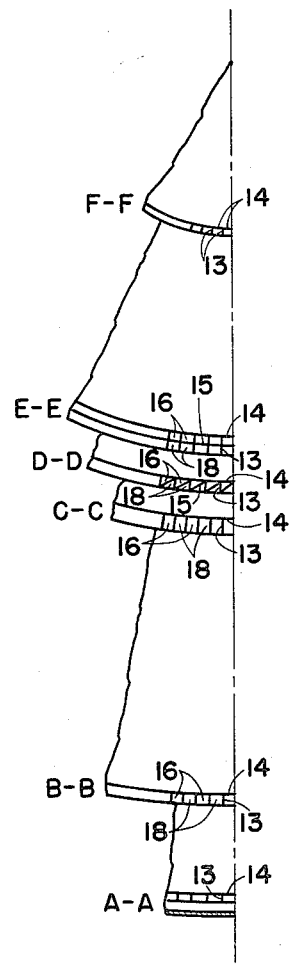
FIG. 9 is a series of fragmentary views taken on the lines A—A, B—B, C—C, D—D, E—E and F—F of FIG. 1
Figure 2:
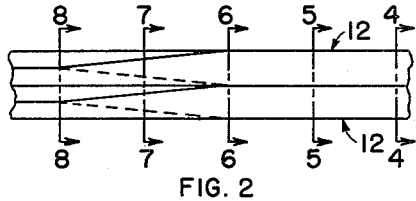
FIG. 2 is a fragmentary enlarged plan view of the transition section 2—2 of FIG. 1.
Figure 3:
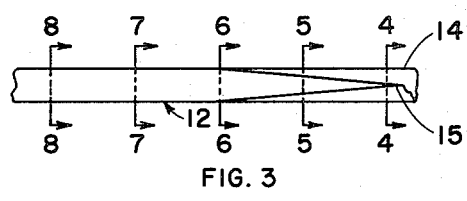
FIG. 3 is a fragmentary enlarged cross-sectional view of the transitional section 2—2 of FIG. 1.
Figure 4:
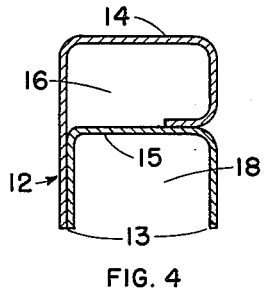
FIG. 4 is a cross-sectional view taken in a line 4—4 of FIGS. 2 and 3.
Figure 5:
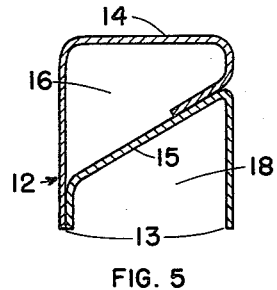
FIG. 5 is a cross-sectional view taken in a line 5—5 of FIGS. 2 and 3.
Figure 6:
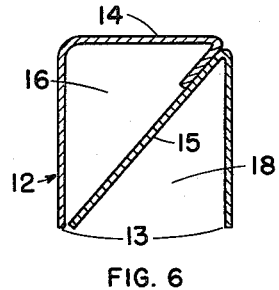
FIG. 6 is a cross-sectional view taken in a line 6—6 of FIGS. 2 and 3.
Figure 7:
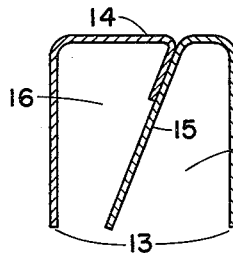
FIG. 7 is a cross-sectional view taken in a line 7—7 of FIGS. 2 and 3.
Figure 8:
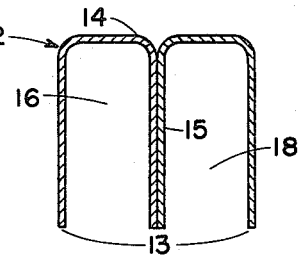
FIG. 8 is a cross-sectional view taken in a line 8—8 of FIGS. 2 and 3.

Referring now to the drawings wherein like reference numerals designate identical or corresponding parts throughout the several views, there is shown in FIG. 1, which illustrates a preferred embodiment, a rocket thrust chamber 11 in accordance herewith. FIG. 1 is a fragmentary cross-sectional view of the rocket thrust chamber 11 fabricated from a plurality of compound channels 12 disposed in contiguous relationship, as shown in FIG. 2 and in FIG. 9. Compound channels 12 are formed from a material capable of withstanding the operating temperatures as well as the corrosive action of the propellants, and it has been found for most purposes that the channels may be constructed of very thin sections, for example, 0.004 inch, nickel or stainless steel. As shown in FIG. 9, the compound channels 12 have upstanding flanges or ribs 13 of varying height at the longitudinal stations indicated. The compound channels 12 are joined together by any suitable brazing material, such as a copper brazing compound by a fabrication process to be hereinafter described in greater detail.

The inner wall of the chamber 11 shown in FIG. 1 is formed from the main web portions 14, as best shown in FIGS. 4–8. Where the diameter of the annular chamber varies between its extremities as it does in the case of the rocket thrust chamber shown in FIG. 1, it is essential that the width of web 14 also vary to accommodate the resultant changes in circumference. Coolant pressure induced stress considerations determine the maximum width of the channel and thus the number required per chamber. For most purposes, a chamber formed from compound channel members in which the member covers an arc of 2° is satisfactory and will number 180 such members.

Each compound channel 12 is provided with a supplementary web member 15 spanning the distance between upstanding flanges 13 in the zone E–F, and thus defining an elongated channel 16 in the compound channel member 12.

In the transition zone 2—2 in FIG. 1, supplemental web member 15 is progressively rotated about its longitudinal axis from a substantially parallel relation with the web 14 to an angular disposition with respect to the web 14 and preferably a perpendicular disposition with respect thereto, all as shown in FIGS. 4–8.

When the upstanding ribs or flange members 13 are bridged by a closing web 17 (FIG. 10) in the form of a thin band circumferentially wound about the channels and secured thereto, there is formed a second elongated channel 18 which is adapted to conduct a fluid in a gas or liquid state therethrough. The channels 16 and 18 are clearly shown in FIG. 9 and FIG. 1.

In the transition section 2—2, passages 16 and 18 are effectively rotated about the axis of symmetry of the compound channel member 12 to change their relative position from that of a superimposed relationship in the zone E–F of FIG. 1 to a side-by-side relation in the zone A–B–C.

As clearly shown in FIG. 1, passages 18 are in free communication with an inlet 19 which is adapted to distribute to each of the channels 18 a fuel reactant or propellant material via a manifold 20. At the outer extremity of the nozzle portion A—A there is provided an annular manifold 21 in open communication with all of the extremities of channels 16 and 18. Thus, cold propellant introduced through manifold 20 is conducted in superimposed relation to returning preheated fuel through channels 18 adjacent the throat located at section F. In the transition zone 2—2 the relationship of the channels changes from that of a superimposed relationship to a side-by-side relationship, as shown in FIGS. 4–8. The entering cool propellant is brought in close proximity with the wall of the nozzle portion to effect cooling thereof. Upon reaching the manifold 21, the propellant enters chambers 16 and returns again along the wall of the nozzle portion to effect further cooling thereof. Channels 16 are continuous through the throat area and the combustion area and terminate in an injection plate 24 where the propellant is admixed with a co-reactant and introduced into the combustion portion of the main chamber.

The channels 16 and 18 vary in cross-section since the height of the channel ribs or flanges 13 is varied as more clearly shown in FIG. 9. In this manner, the propellant is provided with the proper velocity to accomplish the required cooling rates at various points along the surface of the rocket thrust chamber.

Figure 10:
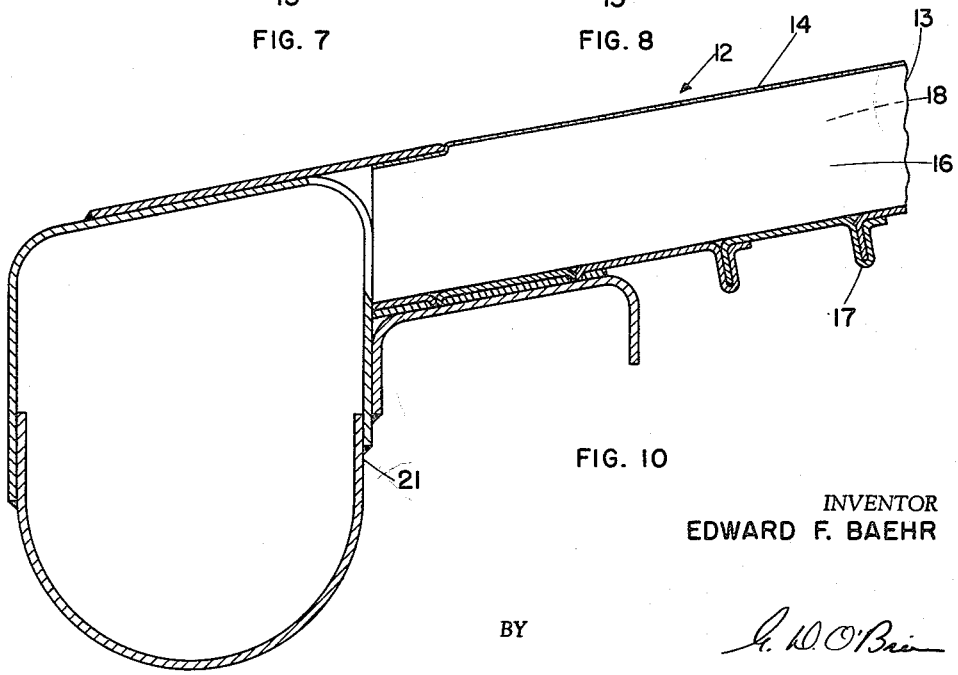
FIG. 10 is a fragmentary enlarged cross-sectional view showing the details of the extremity of the nozzle section shown in FIG. 1.

Although the compound channel members 12 are arranged in contiguous fashion and brazed together in the preferred embodiments, the binding wrapping ribbon 17 also serves to bind the channels together to form the rocket thrust chamber as described in copending application Serial No. 107,870, filed May 4, 1961. Circumferentiail manifold 21 is conveniently brazed along its marginal edges to the extremities of channels 16 and 18, as shown in FIG. 10.

The fabrication process currently employed consists of the following steps: forming the compound channels 12, each characterized by a main web and a supplementary web, the supplementary web being rotated about its axis from a position substantially parallel to the main web to a substantially perpendicular position with respect to the main web in the transition zone 2—2, and said channel members 12 running the entire length of the combustion chamber; bundling of the proper number of preformed compound channels around a brazing mandrel; spot-welding the channels together; grinding the channel ribs 13 to yield the proper uniformly-varying cooling passage heights; metal ribbon wrapping the channel assembly; brazing the wrapped ribbon to the ribs 13 and to the adjacent turns and brazing the channels together; attaching manifolds 20 and 21 and the fuel injector assembly to the rocket thrust chamber. The mechanism for introduction of propellant components forms no part of the present invention and conventional structure for this purpose may be employed.

Thus, there has been provided an improved rocket thrust chamber having an annular wall composed of a plurality of axially disposed pairs of juxtaposed elongated channels extending from adjacent one extremity with the channels in each pair respectively disposed in radially superimposed relation to each other and having their respective passages rotated 90° about the axis of each pair of an intermediate zone until they occupy a side-by-side relation as they extend towards the opposite extremity. There is thus provided a rocket thrust chamber having therewith a large area-ratio nozzle. The process described herein of doubling the number of channels by means of the roll-over transition, although only shown and discussed once, can be repeated as often as required to meet the nozzle exit diameter required.

Obviously, many modifications and variations of the present invention are possible in the light of the above teachings. It is, therefore, to be understood that within the scope of the appended claims, the invention may be practiced other than as specifically described.

What is claimed is:

1. A rocket thrust chamber having a compound wall formed of integrally joined axially disposed compound channel members, each compound channel member having a main web portion adapted to form a circumferential portion of the chamber wall and marginal flanges, a supplementary web portion disposed in predetermined geometric relation to the main web and flanges of each compound channel member, said geometric relation varying progressively from spaced parallel relation to the main web at one end of said channel to an angular relation at the other end, and means forming a closing web portion across the flange extremities to define a pair of axially contiguous parallel enclosed channels adapted to guide a coolant therethrough respectively.

2. A rocket thrust chamber in accordance with claim 1 in which the angular relation between the supplementary web and the main web is 90°, and wherein the supplementary web is spaced equidistant between the marginal flanges.

3. A rocket thrust chamber in accordance with claim 1 in which the means forming a closing web includes a ribbon surrounding the marginal flanges and circumferentially wound about the chamber with adjacent edges of said ribbon overlapping, and including means for sealing the overlapped edges.

4. In a rocket thrust chamber having an axially variable diameter defining enlarged diameter extremities and an intermediate reduced diameter throat portion, the diameters of said enlarged extremities being relatively disparate, a chamber wall comprising a plurality of axially disposed pairs of juxtaposed elongated channels extending from adjacent one enlarged diameter extremity with the channels of each pair respectively disposed in radially superimposed relation to each other and having thier respective passages rotated 90° about the axis of each pair in an axially succeeding section of said wall to dispose said channels in side-by-side relation as they extend toward the other enlarged diameter extremity, and a substantially flat wall separating the passages in each pair, the flat walls being spaced about the thrust chamber with the flat faces thereof extending radially outward with respect to the axis of the thrust chamber when said channels are in the side-by-side relation, said flat walls being rotated 90° so that the flat faces thereof are generally sequential to the thrust chamber when said channels are in the radially superimposed relation.

5. In a rocket thrust chamber having an axially progressively variable diameter defining enlarged diameter extremities and an intermediate reduced diameter throat portion, the diameter of said enlarged extremities being relatively disparate, the chamber wall comprising a plurality of contiguously arranged pairs of juxtaposed elongated channels of substantially rectangular cross-section, the channels of each pair extending from adjacent one extremity with the channels of each pair respectively disposed in radially superimposed relation to each other, and having a common wall portion isolating one channel from the other of said pair, said common wall being progressively rotated 90° about its axis in a section of said channel wall adjacent said throat portion to dispose said channels in side-by-side relation as they extend toward the other extremity, the width of each pair of juxtaposed elongated channels progressively bearing a predetermined dimensional relationship to the diameter of said chamber progressing axially from a reference circumferential width at the small diameter extremity through a relatively smaller circumferential width at the throat portion to a relatively larger circumferential width at the larger diameter extremity.

6. A wall construction for a rearwardly diverging rocket thrust chamber comprising: a plurality of channel members extending in a generally fore and aft direction, each member including a main web and a pair of flange members; said channel members being secured to each other in a peripheral arrangement with said main webs cooperating to form the inner wall of said chamber and said flange members extending generally radially outward with contiguous ones of said flange members being integrally united; at least a portion of the length of at least some of said channel members being in compound form and bearing a supplemental web portion; said supplemental web portion at a first predetermined station being substantially parallel to said main web and dividing said channel member into radially inner and outer passages and extending rearwardly and rotating substantially about its own longitudinal axis to an attitude at a substantial angle to said main web at a second predetermined station and dividing said channel member into peripherally adjacent passages; and web means overlying the open sides of said channels and secured in sealing relation to the free edges of said flange members.

7. A wall construction as claimed in claim 6 in which said channel members are substantially rectangular in cross section to minimize the need for filler material to produce a smooth inner wall for said thrust chamber.

8. A wall structure as claimed in claim 6 in which there are a plurality of transition zones in each of which there is a gradual change in said channel members from radially inner and outer passages to peripherally adjacent passages.

9. A component for use in the construction of the wall of a rearwardly diverging rocket thrust chamber comprising: an elongate rectangular channel member of generally rectangular cross section including a main web and a pair of flange members; said main web being adapted to form a peripheral portion of the inner wall of said thrust chamber with said flange members extending generally radially outward; at least a portion of the length of said channel member being in compound form and bearing a supplemental web portion; said channel member having a transition zone in which said supplemental web portion lies substantially parallel to and spaced from said web at one end of said zone and gradually rotates substantially around its own longitudinal axis to an attitude at a substantial angle to said main web at the other end of said zone to divide said channel member into adjacent passages in radially inner and outer relation at one end of said zone and in side by side relation at the other end of said zone.

10. A substantially annular wall construction for a regeneratively cooled rocket having an axially progressively variable diameter from end-to-end, said annular wall including a plurality of axially extending passage forming members in substantial juxtaposition, said passage forming members being arranged in pairs and each pair of members being in contact with adjacent pairs of members, the members of each pair being in radial alignment with each other at smaller diameters of the wall and in circumferential alignment with each other at the larger diameters of the wall, means for separating the passages in each pair of members along the entire length of said members, said means including a substantially flat wall portion separating said passage at an intermediate section of the annular wall between said smaller diameters and said larger diameters, the flat wall portions being spaced about the annular wall with the flat faces thereof extending radially outward with respect to the axis of said rocket at said larger diameters, said flat wall portions being rotated in said intermediate sections so that said flat faces extend peripherally around the annular wall at said smaller diameters.

11. In a rocket thrust chamber having an axially variable diameter defining enlarged diameter extremities and an intermediate reduced diameter throat portion, the diameters of said enlarged extremities being relatively disparate, the chamber wall comprising a plurality of axially disposed contiguous pairs of juxtaposed elongated channels extending from adjacent one extremity with the channels of each pair respectively disposed in radially superimposed relation to each other and having their respective passages rotated 90° about the axis of each pair in an axially succeeding section of said wall adjacent said throat portion to dispose the channels in side-by-side relation as they extend towards the other extremity, the circumferential width of each pair of juxtaposed channels progressively bearing a predetermined dimensional relationship to the diameter of said chamber progressing axially from a small circumferential width at the small diameter extremity through a relatively smaller circumferential width at the throat portion to a relatively larger circumferential width at the larger diameter extremity, and the radial depth of each of said elongated channels varies progressively in a predetermined manner from a relatively large radial depth adjacent the throat portion to a relatively smaller radial depth at the larger diameter extremity of the chamber.

12. In a regeneratively cooled annular rocket thrust chamber, a compound chamber wall having an axially progressively variable diameter defining an enlarged diameter nozzle extremity, an enlarged diameter reactant inlet extremity, and an intermediate throat portion of reduced diameter, said wall being formed from a plurality of contiguously arranged, axially disposed pairs of elongated channels, the channels constituting each pair extending from adjacent said inlet extremity in radially superimposed relation to each other and having their respective passages progressively rotated in an axially succeeding section of said wall adjacent said throat portion to dispose said channels in side-by-side relation as they extend toward the nozzle extremity, each pair of channels having a substantially rectangular cross-section and an internal common wall portion forming the channels of each pair, said common wall being progressively rotated 90° about its axis in the section of said thrust chamber adjacent said throat portion, means for feeding a fuel reactant material to one channel of each pair adjacent the inlet extremity, and manifold means adjacent the nozzle extremity for respectively reversing the flow of said fuel reactant material into the other channel of each pair.

References Cited by the Examiner
UNITED STATES PATENTS

| | | | |
|---|---|---|---|
| 2,351,152 | 6/44 | Schick. | |
| 2,943,442 | 7/60 | Baehr | 60—35.6 |
| 2,977,754 | 4/61 | Bell | 60—35.6 |
| 3,004,386 | 10/61 | Ledwith | 60—39.66 X |

SAMUEL LEVINE, *Primary Examiner.*
JULIUS E. WEST, *Examiner.*